US012621572B2

(12) United States Patent
Kane et al.

(10) Patent No.: US 12,621,572 B2
(45) Date of Patent: May 5, 2026

(54) SYSTEMS AND METHODS FOR TALKER TRACKING AND CAMERA POSITIONING IN THE PRESENCE OF ACOUSTIC REFLECTIONS

(71) Applicant: Shure Acquisition Holdings, Inc., Niles, IL (US)

(72) Inventors: Zachary Kane, Chicago, IL (US); Christopher George Rieger, Chicago, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 112 days.

(21) Appl. No.: 18/774,697

(22) Filed: Jul. 16, 2024

(65) Prior Publication Data

US 2025/0030947 A1     Jan. 23, 2025

Related U.S. Application Data

(60) Provisional application No. 63/514,046, filed on Jul. 17, 2023.

(51) Int. Cl.
H04N 23/695 (2023.01)
G06T 7/20 (2017.01)
(Continued)

(52) U.S. Cl.
CPC ........... H04N 23/695 (2023.01); H04N 7/147 (2013.01); H04N 23/611 (2023.01); H04N 23/66 (2023.01);
(Continued)

(58) Field of Classification Search
CPC ...... H04N 23/66; H04N 23/661; H04N 23/61; H04N 23/611; H04N 23/69; H04N 23/695;
(Continued)

(56) References Cited

U.S. PATENT DOCUMENTS

| | | | |
|---|---|---|---|
| 5,206,721 A | 4/1993 | Ashida | |
| 5,686,957 A | 11/1997 | Baker | |
| (Continued) | | | |

FOREIGN PATENT DOCUMENTS

| | | |
|---|---|---|
| CN | 102843540 | 12/2012 |
| CN | 107809596 | 3/2018 |
| (Continued) | | |

OTHER PUBLICATIONS

ATND1061DAN, Beamforming Array Microphone, User Manual, Audio-technica, 2022, 107 pp.
(Continued)

*Primary Examiner* — Twyler L Haskins
*Assistant Examiner* — Akshay Trehan
(74) *Attorney, Agent, or Firm* — ALSTON & BIRD LLP

(57) ABSTRACT

Systems and methods configured to generate talker coordinates for directing a camera towards an active talker in the presence of acoustic reflections are disclosed. One method comprises receiving sound location information for a detected audio source from a microphone; determining, based on the sound location information, a first set of coordinates representing an estimated talker location; determining, based on the sound location information and a height of the environment, a second set of coordinates representing a corrected talker location; calculating a weighted height coordinate based on a first height coordinate of the first set of coordinates, a second height coordinate of the second set of coordinates, and stored height coordinates from previously detected audio sources; and transmitting, to a camera, a third set of coordinates comprising the weighted height coordinate and representing a final talker location, to cause the camera to point its image capturing component towards the received location.

20 Claims, 3 Drawing Sheets

(51) Int. Cl.

| | | |
|---|---|---|
| *G06T 7/70* | (2017.01) |
| *H04N 7/14* | (2006.01) |
| *H04N 23/611* | (2023.01) |
| *H04N 23/66* | (2023.01) |
| *H04N 23/69* | (2023.01) |

(52) U.S. Cl.
CPC .............. *H04N 23/69* (2023.01); *G06T 7/20* (2013.01); *G06T 7/70* (2017.01)

(58) Field of Classification Search
CPC . H04N 7/14; H04N 7/147; G06T 7/20; G06T 7/70
See application file for complete search history.

(56) References Cited

U.S. PATENT DOCUMENTS

| | | | | |
|---|---|---|---|---|
| 6,731,334 | B1 | 5/2004 | Maeng | |
| 6,980,485 | B2 | 12/2005 | McCaskill | |
| 7,305,095 | B2 | 12/2007 | Rui | |
| 7,349,008 | B2 | 3/2008 | Rui | |
| 7,403,217 | B2 | 7/2008 | Schulz | |
| 7,487,056 | B2 | 2/2009 | Tashev | |
| 7,586,513 | B2 * | 9/2009 | Muren | H04N 7/15 |
| | | | | 348/211.4 |
| 7,852,369 | B2 | 12/2010 | Cutler | |
| 8,189,807 | B2 | 5/2012 | Cutler | |
| 8,238,573 | B2 | 8/2012 | Ishibashi | |
| 8,248,448 | B2 | 8/2012 | Feng | |
| 9,030,520 | B2 | 5/2015 | Chu | |
| 9,179,098 | B2 | 11/2015 | Buckler | |
| 9,338,549 | B2 | 5/2016 | Haulick | |
| 9,350,940 | B1 | 5/2016 | Baker | |
| 9,392,221 | B2 | 7/2016 | Feng | |
| 9,489,948 | B1 | 11/2016 | Chu | |
| 9,621,795 | B1 * | 4/2017 | Whyte | H04R 1/406 |
| 9,633,270 | B1 | 4/2017 | Tangeland | |
| 9,674,453 | B1 | 6/2017 | Tangeland | |
| 9,769,424 | B2 | 9/2017 | Michot | |
| 9,769,552 | B2 | 9/2017 | Choisel | |
| 9,980,040 | B2 | 5/2018 | Whyte | |
| 10,091,412 | B1 | 10/2018 | Feng | |
| 10,491,809 | B2 | 11/2019 | Feng | |
| 10,582,117 | B1 | 3/2020 | Tanaka | |
| 10,966,022 | B1 | 3/2021 | Chu | |
| 11,127,401 | B2 | 9/2021 | Sarkar | |
| 11,381,906 | B2 | 7/2022 | Rollow, IV | |
| 11,438,691 | B2 | 9/2022 | Veselinovic | |
| 11,601,731 | B1 | 3/2023 | Slotznick | |
| 11,695,900 | B2 | 7/2023 | Childress, Jr. | |
| 11,902,656 | B2 | 2/2024 | Muthiah | |
| 12,143,806 | B2 | 11/2024 | Mcelveen | |
| 2005/0008169 | A1 | 1/2005 | Muren | |
| 2005/0140779 | A1 | 6/2005 | Schulz | |
| 2005/0283328 | A1 | 12/2005 | Tashev | |
| 2006/0005136 | A1 * | 1/2006 | Wallick | H04M 9/082 |
| | | | | 715/726 |
| 2008/0037802 | A1 | 2/2008 | Posa | |
| 2009/0323981 | A1 | 12/2009 | Cutler | |
| 2011/0135125 | A1 | 6/2011 | Zhan | |
| 2011/0285808 | A1 * | 11/2011 | Feng | H04N 7/142 |
| | | | | 348/E7.083 |
| 2011/0285809 | A1 | 11/2011 | Feng | |
| 2011/0317522 | A1 | 12/2011 | Florencio | |
| 2012/0294118 | A1 | 11/2012 | Haulick | |
| 2013/0271559 | A1 | 10/2013 | Feng | |
| 2013/0300820 | A1 | 11/2013 | Liu | |
| 2014/0362163 | A1 | 12/2014 | Winterstein | |
| 2015/0146078 | A1 | 5/2015 | Aarrestad | |
| 2016/0277712 | A1 * | 9/2016 | Michot | G06T 7/20 |
| 2017/0201825 | A1 | 7/2017 | Whyte | |
| 2018/0167581 | A1 | 6/2018 | Goesnar | |
| 2018/0270451 | A1 * | 9/2018 | Dickins | H04N 7/15 |
| 2019/0158733 | A1 | 5/2019 | Feng | |
| 2020/0084366 | A1 | 3/2020 | Fujiwara | |
| 2020/0351435 | A1 | 11/2020 | Therkelsen | |
| 2021/0051397 | A1 | 2/2021 | Veselinovic | |
| 2021/0097995 | A1 | 4/2021 | Sarkar | |
| 2021/0152930 | A1 | 5/2021 | Bryans | |
| 2021/0266680 | A1 | 8/2021 | Frieding | |
| 2021/0345040 | A1 | 11/2021 | Meyer | |
| 2021/0360193 | A1 | 11/2021 | Childress, Jr. | |
| 2022/0201421 | A1 | 6/2022 | Mcelveen | |
| 2022/0353465 | A1 | 11/2022 | Smith | |
| 2023/0025997 | A1 | 1/2023 | Liu | |
| 2023/0053202 | A1 | 2/2023 | Chu | |
| 2023/0086490 | A1 | 3/2023 | Abraham | |
| 2023/0216988 | A1 * | 7/2023 | Yan | H04N 7/15 |
| | | | | 348/14.08 |
| 2024/0007744 | A1 * | 1/2024 | Muthiah | H04N 23/90 |

FOREIGN PATENT DOCUMENTS

| | | |
|---|---|---|
| CN | 108063910 | 5/2018 |
| CN | 108370470 | 8/2018 |
| CN | 112311999 | 2/2021 |
| CN | 112689092 | 4/2021 |
| CN | 113099160 | 7/2021 |
| EP | 0765084 | 3/1997 |
| EP | 1705911 | 9/2006 |
| JP | H01180193 | 7/1989 |
| JP | H0314386 | 1/1991 |
| JP | H1042264 | 2/1998 |
| JP | 2000041228 | 2/2000 |
| JP | 3739673 | 1/2006 |
| JP | 2011193392 | 9/2011 |
| JP | 2020043456 | 3/2020 |
| KR | 101884446 | 8/2018 |
| KR | 102407872 | 6/2022 |
| WO | 2008047804 | 4/2008 |

OTHER PUBLICATIONS

AVer Press Release, "AVer Partners with Sennheiser to Transform Video and Audio Collaboration," Nov. 18, 2021, 1 p.

AVer PTZ Link, User Manual, AVer Information Inc., 2022, 71 pp.

Dong, et al., "Research on TDOA based microphone array acoustic localization," IEEE 12th International Conference on Electronic Measurement & Instruments, 2015, 5 pp.

HDL300 System, Nureva Product Page, Downloaded from webpage <https://www.nureva.com/audio-conferencing/hdl300> on Dec. 4, 2024, 10 pp.

International Search Report and Written Opinion for PCT/US2024/036908 dated Nov. 13, 2024, 14 pp.

Introducing StreamSet, Audio-technica, Product Page, Downloaded from webpage <https://www.audio-technica.com/en-us/> on May 15, 2023, 7 pp.

Kuhn, "Adaptive Audio/Video Zone Creation in Online Meeting Environment," ip.com, Jun. 22, 2022, 5 pp.

Mitchell, "Poly Studio review: Take the pain out of videoconferencing," ITPro, Sep. 17, 2019, 9 pp.

MXA920 Command Strings, Shure, User Manual, 2024, 41 pp.

Vissonic Audio Solutions, Array Microphone Conference Solution, Downloaded from <https://www.vissonic.com/solution/220.html> on Dec. 4, 2024, 7 pp.

Webex Help Center, "Differences between the presenter and the audience, briefing room, and classroom setups," Downloaded from website <https://help.webex.com/en-us/article/n4522teb/Set-up-classroom-on-Room-Series> on Feb. 11, 2025, 15 pp.

Yealink, MeetingEye 800, 4K UHD Video Conferencing Endpoint, Information Sheet, 2022, 4 pp.

Aarabi, "The Fusion of Distributed Microphone Arrays for Sound Localization," EURASIP Journal on Applied Signal Processing, vol. 2003, No. 4, Jan. 2003, 10 pp.

Dibiase, et al., "Robust Localization in Reverberant Rooms," Microphone Arrays, 2001, 24 pp.

Gabriel, et al., "Design and assessment of multiple-sound source localization using microphone arrays," Proceedings of the 2019 IEEE/SICE Intl. Symposium on System Integration, Jan. 2019, 6 pp.

(56)            References Cited

OTHER PUBLICATIONS

International Search Report and Written Opinion for PCT/US2022/076815 dated Jan. 5, 2023, 12 pp.

International Search Report and Written Opinion for PCT/US2023/026753 dated Sep. 15, 2023, 13 pp.

International Search Report and Written Opinion for PCT/US2023/030647 dated Nov. 9, 2023, 11 pp.

Ishi, et al., "Using multiple microphone arrays and reflections for 3D localization of sound sources," 2013 IEEE/RSJ International Conference on Intelligent Robots and Systems, 6 pp.

Ishi, et al., "Speech activity detection and face orientation estimation using multiple microphone arrays and human position information," IEEE/RSJ Intl. Conference on Intelligent Robots and Systems, 2015, 6 pp.

Lathoud, et al., "Short-Term Spatio-Temporal Clustering Applied to Multiple Moving Speakers," IEEE Transactions on Audio, Speech, and Language Processing, vol. 15, No. 5, Jul. 2007, 15 pp.

Legg, et al., "A Combined Microphone and Camera Calibration Technique with Application to Acoustic Imaging," IEEE Transactions on Image Processing, vol. 22, No. 10, pp. 4028-4039, Oct. 1, 2013, 12 pp.

Nishiura, et al., "Collaborative Steering of Microphone Array and Video Camera Toward Multi-lingual Tele-conference Through Speech-to-Speech Translation," IEEE Workshop on Automatic Speech Recognition and Understanding, 2001, 4 pp.

Ronzhin, et al., "Audiovisual Speaker Localization in Medium Smart Meeting Room," IEEE ICICS 8th International Conference, Dec. 2011, 5 pp.

Sharma, "The Ultimate Guide to K-Means Clustering: Definition, Methods and Applications," Analytics Vidhya, Nov. 3, 2023, 19 pp.

Thiergart, et al., "Localization of Sound Sources in Reverberant Environments Based on Directional Audio Coding Parameters," Audio Engineering Society Convention 127, New York, Oct. 2009, 14 pp.

Wang, et al., "Voice Source Localization for Automatic Camera Pointing System in Videoconferencing," 1997 IEEE International Conference on Acoustics, Speech, and Signal Processing, vol. 1, 4 pp.

* cited by examiner

100

SYSTEMS AND METHODS FOR TALKER TRACKING AND CAMERA POSITIONING IN THE PRESENCE OF ACOUSTIC REFLECTIONS

CROSS-REFERENCE

This application claims priority to U.S. Provisional Patent Application No. 63/514,046, filed on Jul. 17, 2023, the contents of which are incorporated by reference herein in their entirety.

TECHNICAL FIELD

This disclosure generally relates to talker tracking and camera positioning, and more specifically, to systems and methods for positioning a camera towards a talker based on a talker location determined in the presence of acoustic reflections using one or more microphones.

BACKGROUND

Various audio-visual environments, such as conference rooms, boardrooms, classrooms, video conferencing settings, performance venues, and more, typically involve the use of microphones (including microphone arrays) for capturing sound from one or more audio sources (e.g., human speakers or talkers) in the environment and one or more image capture devices (e.g., cameras) for capturing images and/or videos of the one or more audio sources or other persons and/or objects in the environment. The captured audio and video may be disseminated to a local audience in the environment through loudspeakers (for sound reinforcement) and display screens (for visual reinforcement), and/or transmitted to a remote location for listening and viewing a remote audience (such as via a telecast, webcast, or the like). For example, the transmitted audio and video may be used by persons in a conference room to conduct a conference call with other persons at the remote location.

In some cases, it can be difficult for the viewers at the remote location to see particular talkers, for example, when the camera is configured to show the entire room, or fixed on a specific portion of the room while the talkers move in and out of view. Some existing camera systems are configured to actively move or point a camera towards the direction of a detected talker, such as a human in the environment that is speaking, singing, or otherwise making sounds, so that viewers, locally or remotely, can better see who is talking. Some cameras use motion sensors and/or facial recognition software in order to guess which person is talking for camera tracking purposes. Some camera systems use multiple cameras to optimally capture persons located at different parts of the environment or otherwise capture video of the whole environment.

SUMMARY

The techniques of this disclosure provide systems and methods designed to, among other things: (1) determine coordinates for positioning a camera towards a talker based on a talker location identified by at least one microphone in an environment; and (2) adjust the talker coordinates based on a height of the environment and previously detected talker heights to account for acoustic reflections in the environment.

In an embodiment, a method, performed by one or more processors in communication with each of a camera and at least one microphone disposed in an environment, comprises: receiving, from the at least one microphone, sound location information for an audio source detected by the at least one microphone; determining, based on the sound location information, a first set of coordinates representing an estimated talker location for the audio source; determining, based on the sound location information and a height measurement of the environment, a second set of coordinates representing a corrected talker location for the audio source; calculating a weighted height coordinate based on a first height coordinate of the first set of coordinates, a second height coordinate of the second set of coordinates, and stored height coordinates obtained for previously detected audio sources; and transmitting, to the camera, a third set of coordinates comprising the weighted height coordinate and representing a final talker location for the audio source, wherein receipt of the third set of coordinates causes the camera to point an image capturing component of the camera towards the final talker location.

In another embodiment, a system comprises at least one microphone disposed in an environment and configured to determine sound location information for an audio source detected by the at least one microphone; a camera disposed in the environment and comprising an image capturing component; and one or more processors communicatively coupled to each of the at least one microphone and the camera, the one or more processors configured to: receive the sound location information from at least one microphone; determine, based on the sound location information, a first set of coordinates representing an estimated talker location for the audio source; determine, based on the sound location information and a height measurement of the environment, a second set of coordinates representing a corrected talker location for the audio source; calculate a weighted height coordinate based on a first height coordinate of the first set of coordinates, a second height coordinate of the second set of coordinates, and stored height coordinates obtained for previously detected audio sources; and transmit, to the camera, a third set of coordinates comprising the weighted height coordinate and representing a final talker location for the audio source, wherein response to receiving the third set of coordinates, the camera is configured to point the image capturing component towards the final talker location.

In a further embodiment, a non-transitory computer-readable storage medium comprises instructions that, when executed by one or more processors in communication with each of at least one microphone and a camera, cause the one or more processors to perform: receive sound location information for an audio source detected by at least one microphone; determine, based on the sound location information, a first set of coordinates representing an estimated talker location for the audio source; determine, based on the sound location information and a height of the environment, a second set of coordinates representing a corrected talker location for the audio source; calculate a weighted height coordinate based on a first height coordinate of the first set of coordinates, a second height coordinate of the second set of coordinates, and stored height coordinates obtained for previously detected audio sources; and transmit, to the camera, a third set of coordinates comprising the weighted height coordinate and representing a final talker location for the audio source, wherein receipt of the third set of coordinates causes the camera to point the image capturing component towards the final talker location.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
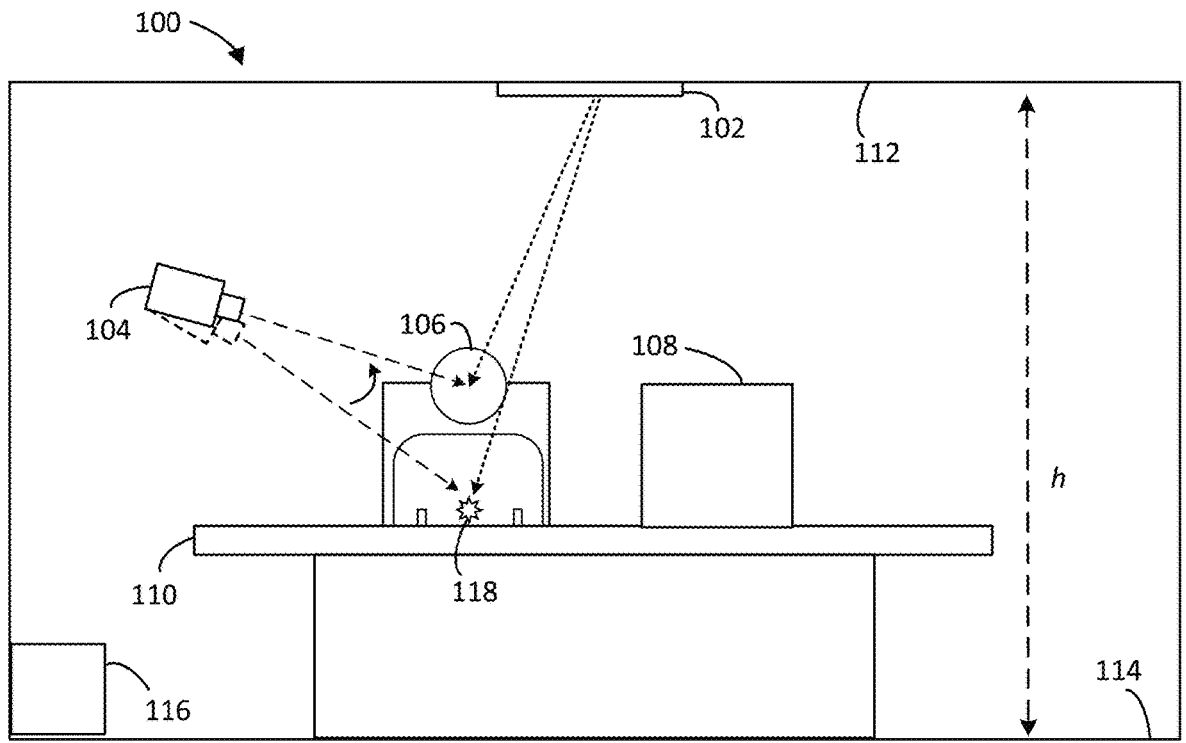
FIG. 1 is a schematic diagram of an exemplary environment comprising an audio-visual system that can be utilized to position a camera towards a talker location determined using talker coordinates obtained by at least one microphone in the presence of acoustic reflections, in accordance with one or more embodiments.

In general, audio systems use microphone information and algorithms to estimate the position of an audio source or talker (e.g., a human speaking, singing, performing, or otherwise making sound), relative to the microphone. For example, a beamforming array microphone may be used to obtain coordinates (e.g., localization coordinates) for an estimated location of sound generated by an audio source and detected by the microphone. In audio-visual systems, the talker coordinates are provided to a camera for talker tracking and camera positioning purposes. For example, the camera may use the coordinates to direct an image capture component of the camera towards the estimated talker location (e.g., using pan, tilt, and/or zoom features of the image capture component).

When an individual talks into an object, such as, e.g., a table, countertop, laptop, or other surface in the environment 100, sounds produced by the talker can reflect off of the surface, thus generating acoustic reflections. In some cases, the acoustic reflections can be strong enough to cause the microphone to detect the location of the reflection as an audio source, instead of the actual talker's location. In such cases, the camera may be directed towards the surface in front of the talker, instead of the talker themselves. In other cases, the acoustic reflection may degrade an accuracy of the estimated talker location determined by the microphone such that the camera is directed towards an inaccurate talker location (e.g., away from the active talker, not centered on the active talker, etc.).

The systems and methods described herein can improve the configuration and usage of audio-visual systems, such as, e.g., conferencing systems, stage performance systems, gaming systems, and others, by using height information for a given environment to improve an accuracy of an estimated talker location determined using audio localization information (e.g., coordinates) gathered by one or more microphones (or microphone arrays) in the presence of acoustic reflections. The improved estimation better enables a camera of the audio-visual system to be directed towards the corresponding talker, rather than the reflecting surface or other imprecise location.

According to various embodiments, the height information can include a height of the environment, such as, e.g., a height of the microphone in the environment (or microphone height), for example, where the microphone is suspended from or coupled to a ceiling of the environment, a height of the ceiling of the environment (or ceiling height), for example, where the microphone is mounted to or integrated into the ceiling, or any other relevant height measurement associated with the environment. The height information can also include stored height data that indicates a height (or height coordinate) for each of a plurality of talker locations previously detected in the same or similar environment. The height information may be used in various ways to help differentiate acoustic reflections from actual talker locations or otherwise minimize the adverse effects of acoustic reflections when estimating a talker location. For example, the ceiling or microphone height can be used to apply a height-based correction to talker coordinates estimated for a detected talker location. In some cases, the height-based correction, alone, is not enough to minimize the adverse effects of acoustic reflections on camera positioning. To supplement, the stored height data can be configured as a distribution curve that indicates a probability that each of the stored height values is an actual talker height (i.e. not a reflection), and the probabilities from the distribution curve can be used to generate corresponding weight values for height coordinates estimated based on audio localizations from the microphone. The weight values can be used to calculate a weighted average of the height coordinates, which can be combined with other estimated coordinates to improve an accuracy of the talker coordinates provided to the camera for positioning purposes.

FIG. 1 depicts an exemplary audio-visual environment 10 in which one or more of the systems and methods disclosed herein may be used. As shown, the environment 100 comprises a microphone 102, a camera 104, and one or more audio sources 106. The environment 100 may be a conference room, a boardroom, a classroom, or other meeting room; a theater, sports arena, auditorium, or other performance or event venue; or any other space. The one or more audio sources 106 may be human speakers or talkers participating in a conference call, telecast, webcast, class, seminar, performance, sporting event, or any other event, and may be situated at different locations around the environment 100. For example, the one or more audio sources 106 may be local participants of a conference call seated in respective chairs 108 disposed around a table 110, as shown in FIG. 1. While FIG. 1 illustrates one potential environment, it should be understood that the systems and methods disclosed herein may be utilized in any applicable environment.

The microphone 102 can be configured to detect sounds from the audio sources 106, such as human voice or speech spoken by the audio sources 106 and/or music, clapping, or other sounds generated by the same, and convert the detected sounds into one or more audio signals. Though only one microphone 102 is shown in FIG. 1, the microphone 102 can include one or more of an array microphone, a non-array microphone (e.g., directional microphones such as lavalier, boundary, etc.), or any other type of audio input device capable of capturing speech and other sounds. As an example, the microphone 102 may include, but is not limited to, SHURE MXA310, MX690, MXA910, MXA920, MXW1/2/8, ULX-D, and the like.

The microphone 102 may be placed in any suitable location, including on a wall, ceiling, table, lectern, and/or any other surface in the environment 100, and may conform to a variety of sizes, form factors, mounting options, and wiring options to suit the needs of the particular environment. The microphone 102 may be positioned at a select location in the environment 100 in order to adequately capture sounds throughout the environment 100. For example, the microphone 102 may be mounted overhead, as shown in FIG. 1, or on a wall in order to capture the sound from a larger area, e.g., an entire room or hall. In other cases, one or more microphones may be placed on a table, lectern, or other surface near the audio sources in a classroom or conference room environment, or may be attached to the audio sources, e.g., a performer or speaker, in an auditorium, stadium, or musical hall environment. The exact type, number, and placement of microphone(s) in a particular environment may depend on the locations of audio sources, listeners, physical space requirements, aesthetics, room layout, stage layout, and/or other considerations.

In the illustrated embodiment, the microphone 102 is attached to, or mounted on, a ceiling 112 of the environment 100 above the table 110, so as to capture sound from the one or more audio sources 106 situated around the table 110. The microphone 102 may be integrated into the ceiling 112, or a ceiling tile included therein, coupled to a post (not shown) that is attached to the ceiling 112, suspended from the ceiling 112 using one or more wires or cables, or otherwise attached to the ceiling 112, as will be appreciated. The microphone 102 may be situated a defined height, h, relative to, or above, a floor 114 of the environment 100, as shown. In some embodiments, the microphone height may be calculated relative to a top surface of the table 110, for example, where the table height is fixed and/or previously stored in a memory.

In embodiments, the microphone 102 can be configured to form one or more pickup patterns with lobes that can be steered to sense audio in particular locations within the environment 100. For example, the microphone 102 may be an array microphone comprised of a plurality of microphone elements (not shown), each of which is configured to detect sound and convert the detected sound to a digital or analog audio signal. In such cases, audio output signals generated by the microphone 102 may be configured to correspond to one or more pickup patterns, which may be composed of, or include, one or more lobes (e.g., main, side, and back lobes) and/or one or more nulls. The pickup patterns formed by the microphone 102 may be dependent on the type of beamformer used with the microphone elements. For example, a delay and sum beamformer may form a frequency-dependent pickup pattern based on its filter structure and the layout geometry of the microphone elements. As another example, a differential beamformer may form a cardioid, subcardioid, supercardioid, hypercardioid, or bidirectional pickup pattern. Other suitable types of beamformers may include a minimum variance distortionless response ("MVDR") beamformer, and more.

The camera 104 can be configured to capture still images or pictures, moving images, video, or other imagery of the environment 100. In some embodiments, the camera 104 may be a standalone camera, while in other embodiments, the camera 104 may be a component of an electronic device, e.g., smartphone, tablet, etc. In some cases, the camera 104 may be included in the same electronic device as one or more other components of the environment 100, such as, e.g., the microphone 102. The camera 104 may be a pan-tilt-zoom (PTZ) camera that can physically move and zoom to capture desired images and video, or may be a virtual PTZ camera that can digitally crop and zoom images and videos into one or more desired portions. The environment 100 may also include a display (not shown), such as a television or computer monitor, for showing images and/or video associated with the remote participants of a conference call, for example, or other image or video content. In some embodiments, the display may include one or more microphones, cameras, and/or loudspeakers, for example, in addition to or including the microphone 102 and/or camera 104.

As shown in FIG. 1, the environment 100 further includes a control module 116 for enabling a conferencing call, webinar, telecast, or otherwise implementing one or more aspects of the meeting or event, and/or carrying out one or more of the techniques described herein. The control module 116 may be implemented in hardware, software, or a combination thereof. In some embodiments, the control module 116 may be a standalone device, such as a controller, control device, computing device, or other electronic device, or included in such a device. In other embodiments, all or portions of the control module 116 may be included in the microphone 102 and/or the camera 104. In one exemplary embodiment, the control module 116 may be a generic computing device comprising a processor and a memory device. In another exemplary embodiments, the control module 116 may be part of a cloud based system or otherwise reside in an external network.

It should be understood that the components shown in FIG. 1 are merely exemplary, and that any number, type, and placement of the various components in the environment 100 are contemplated and possible, including, for example, different arrangements of the audio sources 106, audio sources 106 that move about the room, different arrangements of the environment 100, the table 110 and/or the chairs 108, different locations for the microphone 102 and/or the camera 104, a different number of audio sources 106, microphones 102, and/or cameras 104, etc. For example, besides the audio source (or talker) 106, the environment 100 may include one or more other persons and/or other objects (e.g., loudspeakers, musical instruments, phones, tablets, computers, HVAC equipment, etc.) that are not shown. In embodiments, one or more of the components in the environment 100 may include one or more digital signal processors or other processing components, controllers, wireless receivers, wireless transceivers, etc.

In various embodiments, the control module 116, the microphone 102, and the camera 104 can form, or be part of, an audio-visual system (such as, e.g., audio-visual system 300 shown in FIG. 3) that is configured to improve an accuracy of talker locations determined using audio localization information obtained by the microphone 102 in the presence of acoustic reflections (e.g., acoustic reflection 118 in FIG. 1), and use the improved talker locations to ensure that the camera 104 is directed towards the active talker 106, not the table 110 or other reflecting surface, for example. In general, the microphone 102 can be configured to detect a location of an active talker, or audio source 106, in the environment 100 using an audio localization algorithm and provide an estimate of the detected talker location, or corresponding audio localization coordinates, to the control module 116. The estimated talker location can be provided to the camera 104 for positioning an image capturing component (not shown) of the camera 104 towards the talker 106. For example, the camera 104 can utilize the received talker location for moving, zooming, panning, framing, or otherwise adjusting the image and video captured by the camera 104. In this manner, the audio-visual system of FIG. 1 can be configured to enable the camera 104 to more accurately capture the image and/or video of the audio source 106.

More specifically, the microphone 102 can be configured to generate or provide sound location information for an active audio source or talker detected by the microphone 102. The sound location information can include an audio or sound localization that indicates an estimated location of the sound or audio activity detected by the microphone 102 in association with the active talker (e.g., audio source 106). For example, the microphone 102 can be configured to generate a localization of the detected sound and determine coordinates (or "localization coordinates") that represent the estimated position of the detected sound relative to the microphone 102. Thus, the sound location information provided by the microphone 102 may include the localization coordinates, or otherwise indicate the estimated talker location. In some embodiments, the microphone 102 may include or use an audio activity localizer (not shown), or the like, to determine a direction of arrival of detected audio activity and generate the audio localization or other data that represents the location of the detected sound relative to the microphone 102. Various methods for generating sound localizations are known in the art, including, for example, a Generalized Cross Correlation Phase Transform (GCC-PHAT) algorithm or other GCC algorithm, a Steered-Response Power Phase Transform (SRP-PHAT) algorithm, a time of arrival (TOA)-based algorithm, a time difference of arrival (TDOA)-based algorithm, Multiple Signal Classification (MUSIC) algorithm, an artificial intelligence-based algorithm, a machine learning-based algorithm, and others. As will be appreciated, the location obtained by the sound source localization algorithm may represent a perceived location of the audio activity or other estimate obtained based on the audio signals received from the microphone 102, which may or may not coincide with the actual or true location of the audio activity.

The localization coordinates may be Cartesian or rectangular coordinates that represent a location point in three dimensions, or x, y, and z values. In some embodiments, the localization coordinates may be converted to polar or spherical coordinates, i.e. azimuth (phi), elevation (theta), and radius (r), for example, using a transformation formula, as is known in the art. The spherical coordinates may be used in various embodiments to determine additional information about the environment, such as, for example, a distance between the active talker 106 and the microphone 102. In some embodiments, the localization coordinates for the detected sound position may be relative to a coordinate system of the microphone 102 and may be converted or translated to a coordinate system of the camera 104, the environment 100, or vice versa. In various embodiments, the sound location information generated by the microphone 102 also includes a timestamp or other timing information to indicate the time at which the coordinates were generated, an order in which the coordinates were generated, and/or any other information to help identify coordinates that were generated simultaneously, or nearly simultaneously, for the same audio source 106.

In the above examples, the control module 116 is configured to receive the sound location information (e.g., localization coordinates) from the microphone 102 and determine an estimated talker location based thereon. In other embodiments, the control module 116 may receive other types of information for identifying a talker location, in addition to, or instead of, the audio source localization coordinates. For example, the environment 100 may further include one or more other sensors (i.e. besides the microphone 102) that are configured to detect or determine a current location of a human talker or other audio source within an audio coverage area. Such additional sensors may include a thermal sensor, a Time-of-Flight ("ToF") sensor, an optical sensor, and/or any other suitable sensor or device. Accordingly, the sound location information may include audio localization coordinates determined by the microphone 102 for estimating the talker location or other types of talker location information determined by other types of sensor(s).

In some embodiments, upon receiving the sound location information from the microphone 102, the control module 116 can be configured to convert the localization coordinates estimated for the active talker 106 into a coordinate system of the camera 104 or a common coordinate system of the environment 100, before providing the coordinates or other location information to the camera 104 for positioning the camera 104 towards the talker 102. For example, the localization coordinates received at the control module 116 may be relative to a coordinate system of the microphone 102 that generated the data. In such cases, the control module 116 may convert the localization coordinates to a coordinate system of the camera 104 before providing them to the camera 104, so that the camera 104 receives the estimated talker location in a format that is understandable and useful to the camera 104.

In some embodiments, the control module 116 can be configured to use a clustering algorithm to improve an accuracy of the estimated talker location by preventing outliers and other erroneous localizations from being used for determination of the estimated talker location. For example, the clustering algorithm can be configured to cluster together a plurality of audio localization coordinates (or points) obtained over time by the microphone 102 for the same or similar area (e.g., around the audio source 106) and identify, based on proximity for example, which set of coordinates within the cluster is most likely to represent the actual location of the audio source 106. The control module 116 may then use the identified set of coordinates to represent the estimated talker location for the audio source 106. Other techniques may also be used to improve a general accuracy of the sound location information used to generate the estimated talker location, as will be appreciated.

As shown in FIG. 1, an acoustic reflection 118 may be present in the environment 100 due to, for example, audio bouncing or reflecting off of a top surface of the table 110, or other surface within the environment 100. For example, the acoustic reflection 118 may occur if the talker 106 is talking into the table 110 or an object on the table 110 (e.g., laptop, tablet, etc.). If the acoustic reflection 118 is strong enough to be detected by the microphone 102 as a potential audio source, the microphone 102 may generate localization coordinates for the acoustic reflection 118 and provide those coordinates to the control module 116 for re-positioning the camera 104 towards the newly detected "talker," i.e. the reflecting surface. This may result in the camera 104 being directed towards the table 110 that caused the acoustic reflection 118, instead of the talker 106 that generated the original audio. In some cases, the acoustic reflection 118 may adversely affect an accuracy of specific coordinate(s) of the estimated talker location, such as, for example, the z or height coordinate, which may still cause misdirection of the camera 104.

In various embodiments, to avoid or minimize the generation of erroneous talker location estimations due to the acoustic reflection 118, the control module 116 can be configured to use height information for the environment 100 to improve an accuracy of the estimated talker locations and help identify or differentiate acoustic reflections from actual talker locations. The height information can include a height, or height measurement, of the environment 100 and stored height data for previously detected audio sources. The control module 116 can be configured to use the height measurement to calculate a height-corrected estimation of the talker location and use the stored height data to further improve an accuracy of the height-corrected talker location estimation.

In particular, the height measurement may be or include a microphone height, h, relative to the floor 114, or the distance between the microphone 102 and the floor 114, for example, in cases where the microphone 102 is suspended from the ceiling 112 by wires, cables, one or more poles, etc., or otherwise coupled to the ceiling 112 and configured to extend a certain distance below the ceiling 112, as shown. In some cases, the height measurement may be or include a ceiling height for the environment 100, or the distance between the ceiling 112 and the floor 114, for example, when the microphone 102 is mounted to, or integrated into, the ceiling 112, such that the microphone 102 is substantially flush with the ceiling 112. In other cases, the height measurement may be relative to the reflection surface, or the distance between the microphone 102 and a top surface of the table 110.

The height measurement can be used to apply a height-based correction to the coordinates for an estimated talker location, for example, using a height-scaled estimation algorithm or technique for removing or minimizing the adverse effects of acoustic reflections. In particular, the height-scaled technique may produce a more accurate estimation for a z or height coordinate of the estimated talker location, for example, as compared to a standard or non-height-scaled estimation algorithm that is typically used to determine an estimated talker location (e.g., as described above). In some cases, however, the presence of acoustic reflections may cause the height-scaled technique to produce less accurate estimations for the x and y coordinates of the talker location, again compared to the standard estimation algorithm, for example.

In embodiments, the control module 116 can be configured to use a hybrid estimation technique that leverages the stored height data to minimize or remove the adverse effects of acoustic reflections on an estimated talker location. In particular, the hybrid technique is configured to generate an improved estimation of the talker coordinates by first comparing the estimated coordinates generated using the standard estimation technique to the corrected coordinates generated using the height-scaled estimation technique to determine if there is a large discrepancy between the two estimations. A large discrepancy may be an indication that a strong acoustic reflection is present in the environment 100, and thus causing the two estimation techniques to produce divergent results. For example, the control module 116 may determine that a large discrepancy is present if the difference between the standard z coordinate and the corrected coordinate exceeds a threshold value (e.g., about 50 centimeters (cm), etc.). If a large discrepancy is not found, i.e. strong table reflections are not present, the height-scaled coordinates may be used to indicate the estimated talker location, in some embodiments. In other embodiments, the non-height-scaled coordinates may be used. If a large discrepancy does exist, the hybrid technique can be further configured to combine the two estimations and use the stored height data to apply different weights to different coordinates in the combination, so that the resulting set of coordinates represents a more accurate estimation of the talker location. In embodiments, the hybrid technique can be configured to combine the two estimations to create a third set of coordinates by taking the coordinates estimated using the standard estimation technique (which typically produces more accurate x and y coordinates) and replacing the z or height coordinate of that set with a weighted height coordinate that is determined based on the stored height data. The control module 116 may provide the third set of coordinates to the camera 104 as the final talker location, and the camera 104 may use these coordinates to position the camera 104 towards the talker 106.

The stored height data can include prior talker heights, or height coordinates or values for a plurality of talker locations that were previously detected by the microphone 102. For example, the previous talker locations may have been estimated using the standard estimation technique, the height-corrected estimation technique, or a combination thereof (e.g., the hybrid technique). The prior talker heights may be relative to the microphone 102, as shown, or relative to another coordinate system of the environment 100 (e.g., that of the camera 104). The stored height data may be stored in a memory of the control module 116 or other memory or database of the environment 100 and may be retrieved by one or more processors of the control module 116 in connection with execution of the hybrid technique. In some embodiments, the stored height data can be stored or configured as a distribution curve that indicates a probability that each of the stored height values is an actual talker height and not a reflection.

Figure 2:
FIG. 2 is a plot of previously detected talker heights for the environment of FIG. 1, in accordance with one or more embodiments.
Figure 2:
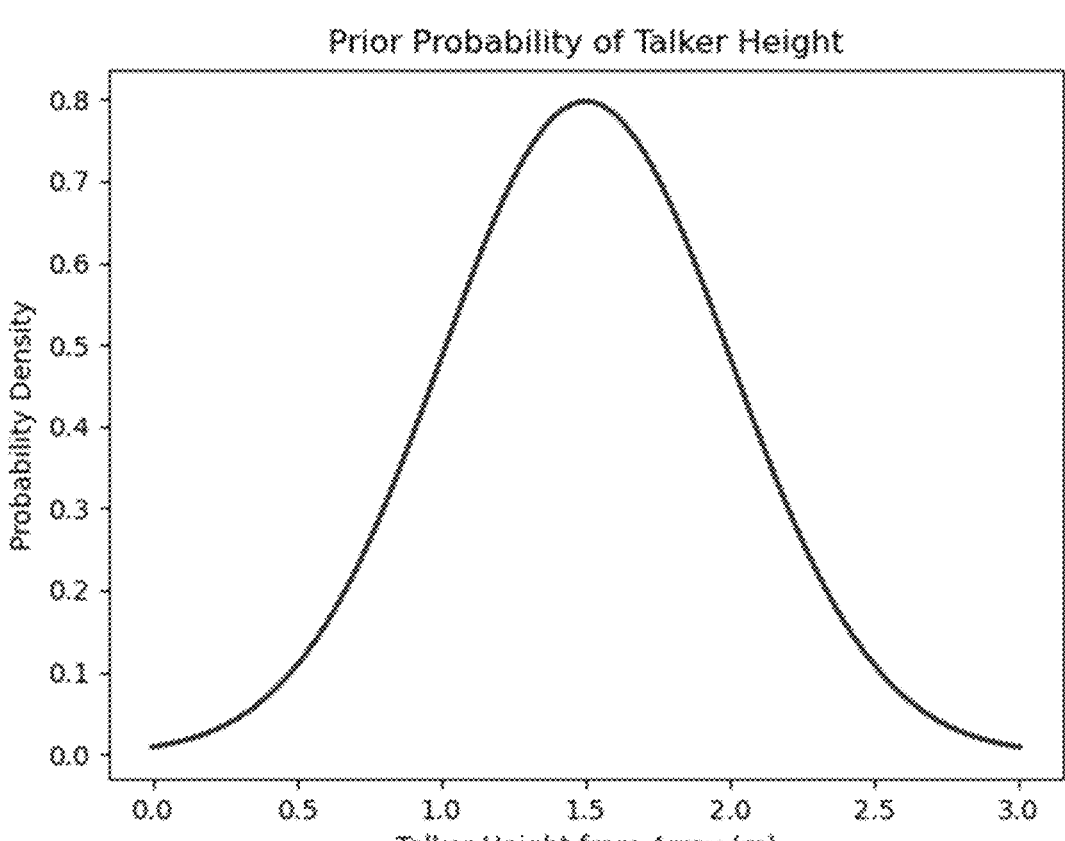

For example, referring now to FIG. 2, shown is an exemplary graph 200 plotting a probability density of previously detected talker heights for the environment 100, in accordance with embodiments. As shown, a talker height of 1.5 meters (m) from the microphone 102 is the most common occurrence, presumably because it corresponds to a human talker of average height sitting in one of the chairs 108 in the environment 100, and from there, the talker heights gradually taper off in either direction. For example, talker heights of 1.0 meter and 2.0 meters have equivalently average probabilities (e.g., 0.5), while talker heights of 0.5 meter and 2.5 meters have equivalently low probabilities (e.g., 0.1). As also shown, a probability of zero has been assigned to a talker height of 3 meters, which generally coincides with the total height of the environment 100 (or the microphone height) and thus, is unlikely to be a human talker, and to a talker height of 0 meters, which generally coincides with the height of the floor 114. In general, the distribution curve can be configured to show the likelihood of the talker 106 sitting at the table 110 versus standing next to or near the table 110, with multiple variations therebetween and beyond due to, for example, differences in individual talker heights, chair heights, etc.

In embodiments, the hybrid technique includes a likelihood weighting function that uses the distribution curve of FIG. 2 to calculate a weighted height coordinate based on a first height coordinate determined using the standard estimation technique and a second height coordinate determined using the height-scaled estimation technique. For example, a weight value may be assigned to each estimated height coordinate based on the distribution curve shown in graph 200, and the weighted height coordinate may be calculated by taking a weighted average of the first and second height coordinates. In the illustrated embodiment using graph 200, a talker height of 1.5 m would be assigned the highest weight value (e.g., 0.8) as it is most likely to be the actual talker 106 seated at the table 110, while talker heights at either extreme (e.g., 0 and 3 m) would be assigned a zero weight value. The graph 200 also shows that, assuming the table 110 has a height of about 70 to 80 cm, the table reflection 118 would be assigned a low weight value (e.g., 0.2), which effectively minimizes the height coordinate estimated for the table reflection 118, thus improving an accuracy of the talker location estimation.

The following exemplary equations may be used to implement the hybrid technique, in accordance with various embodiments. After determining estimated coordinates (x, y, z,) for the estimated talker location using the standard estimation technique, the height-based correction algorithm is used to calculate corrected coordinates (x', y' z') using, for example, Equation 1:

$$\vec{X'} = \vec{X} * \frac{h - 1.4}{z}, \qquad (1)$$

where $\vec{X}=[x, y, z]$, $\vec{X'}=[x', y', z']$, and h=microphone height (meters). Once $\vec{X'}$ and $\vec{X}$ have been computed, the coordinates are saved in a memory of the control module 116, for example, by adding them onto the end of an evolving list of previously determined coordinates, as shown by Equation 2:

$$\Upsilon = \begin{bmatrix} \vec{X_1} \\ \vec{X_1'} \\ \vec{X_2} \\ \vec{X_2'} \\ \dots \\ \vec{X_N} \\ \vec{X_N'} \end{bmatrix} \qquad (2)$$

If a large discrepancy is determined between $\vec{X}=[x, y, z]$ and $\vec{X'}=[x', y', z']$, a weighted sum is calculated based on the probabilities shown in the distribution curve of FIG. 2 and a final output is provided as $\vec{X''}=(x, y, z'')$, z'' being calculated using Equation 3:

$$z'' = \frac{1}{\sum_{i=1}^{N} P_r(\Upsilon(i))} * \sum_{i=1}^{N} \Upsilon(i, z) * Pr(\Upsilon(i)), \qquad (3)$$

where $Pr(\vec{X}_i)$ is the probability of the estimated talker location's z coordinate.

In embodiments, one or more parameters of the graph 200 can be user-configurable and thus, may adjust a distribution of the curve shown in FIG. 2. For example, a height parameter for indicating a height of the environment may be configured by the user prior to running the hybrid algorithm, or may be previously entered and stored at the control module 116. The height parameter may refer to a ceiling height of the environment or a height of the microphone in the environment (e.g., height h in FIG. 1), for example. Adjusting the height parameter may change an overall shape of the distribution curve shown in FIG. 2, as will be appreciated. As another example, a width of the distribution curve may be adjusted by configuring a reflection parameter for indicating a level of reverberation in the environment 100. The level of reverberation may be determined based on the number or amount of reflective materials in the room, the size of the reflective materials (e.g., a large table surface), the distribution of the reflective materials around the room (e.g., close together or spread apart), and any other factors than may determine how acoustically reflective the environment 100 is. Another user-configurable parameter may be table height. For example, FIG. 2 may correspond to a use case in which the table height parameter is set to a standard table height, e.g., the table 110 shown in FIG. 1. If the table height parameter were changed to indicate a high top table, or other table at bar height, for example, a width of the distribution curve would become narrower than that shown in FIG. 2 because the average height of a talker in a sitting position would be very similar in value to the average height of a talker in a standing position.

Thus, the stored height data, or the distribution curve shown in FIG. 2, can be used to remove or minimize the acoustic reflection 118 present in the environment 100 and improve an overall accuracy of the estimated talker location determined for the audio source 106. While specific equations and algorithms are described herein, other, similar techniques may also be used, in addition to or in the alternative, to improve the coordinates estimated for a detected talker.

To illustrate the hybrid technique in more detail, a use case where a talker is located at a position having coordinates x=1.22 m, y=0 m, and z=1.45 will now be described. The talker's location may be estimated to be at different locations depending on the technique used and whether reflections are present. For example, using the standard estimation technique, which does not take into account height information, the talker location may be estimated as being at coordinates (1.25, 0.05, 2.00) in the presence of egregious table reflections. This provides a three-dimensional cartesian error of 0.55 meters, which is unacceptable for most camera systems. When the height-scaled technique is used, the resulting height-corrected coordinates may be (0.60, 0.15, 1.35). This provides an even worse error of 0.65 meters. Using the probability curve of the hybrid technique described herein can correct the x, y, z coordinates estimated for the talker location by mixing the x and y coordinates from the unscaled estimates with a weighted combination of the height-scaled estimates, thus resulting in coordinates that are (1.25, 0.05, 1.51), which has an error of only 0.08 meters. In this example, the probability of the height-scaled z-value was about 75%, while the probability of the non-height-scaled z-value was only about 25%. As demonstrated by the above, the hybrid technique described herein can improve not only the z coordinate, but all three coordinates for the estimated talker location (e.g., as compared to using any existing techniques alone).

Figure 3:
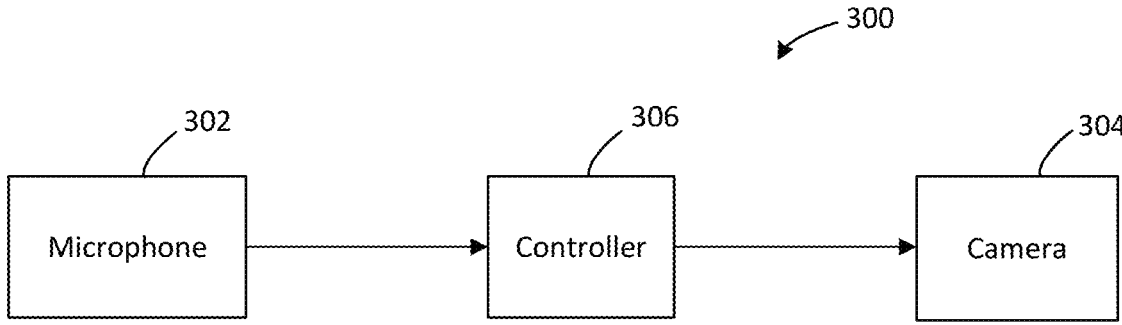
FIG. 3 is a block diagram of an exemplary audio-visual system that is usable as any of the systems described herein, in accordance with one or more embodiments.

FIG. 3 depicts an exemplary audio-visual system 300 (e.g., conferencing system) that may be usable as the audio-visual system of the environment 100 of FIG. 1, in accordance with embodiments. The system 300 can include a microphone 302 (e.g., microphone 102 of FIG. 1) that can detect and capture sounds from one or more audio sources within an environment, including an active talker (e.g., talker 106 of FIG. 1). The microphone 302 can also detect or determine a location of the detected audio sources in the environment. The system 300 can further include a camera 304 (e.g., camera 104 of FIG. 1) that can capture images and/or video of the environment, including that of the active talker.

As shown, the system 300 can also include a controller 306 (e.g., the control module 116 of FIG. 1) that can receive one or more detected locations from the microphone 302, determine an estimated talker location based on the received location(s), and based thereon, control a positioning of the camera 304. For example, the controller 306 can be configured to provide the estimated talker location to the camera 304 (or a separate camera controller, not shown) for repositioning an image capture component (not shown) of the camera 304 towards the detected talker, or otherwise send appropriate signals to the camera 304 that cause the camera 304 to move, pan, tilt, and/or zoom towards the estimated talker location. In some embodiments, the camera 304 may be configured to move with the active talker as they move about the environment (or room).

The components of the system 300 may be in wired and/or wireless communication with each other and/or other components of the environment 100. In some embodiments, the controller 306 can be configured to provide talker coordinates to the camera 304 over an Internet Protocol (IP) such as, e.g., a TCP port or the like. In some embodiments, the controller 306 may be integrated with the microphone 302 and/or the camera 304. In some embodiments, all three components of the system 300 may be included in the same device (e.g., a computing device). It should be understood that the components shown in FIGS. 1 and 3 are merely exemplary, and that any number, type, and placement of the various components of the system 300 are contemplated and possible. For example, in FIG. 3, there may be multiple cameras 304, multiple microphones 302, and/or a camera controller (not shown) coupled between the camera(s) 304 and the controller 306.

Figure 4:
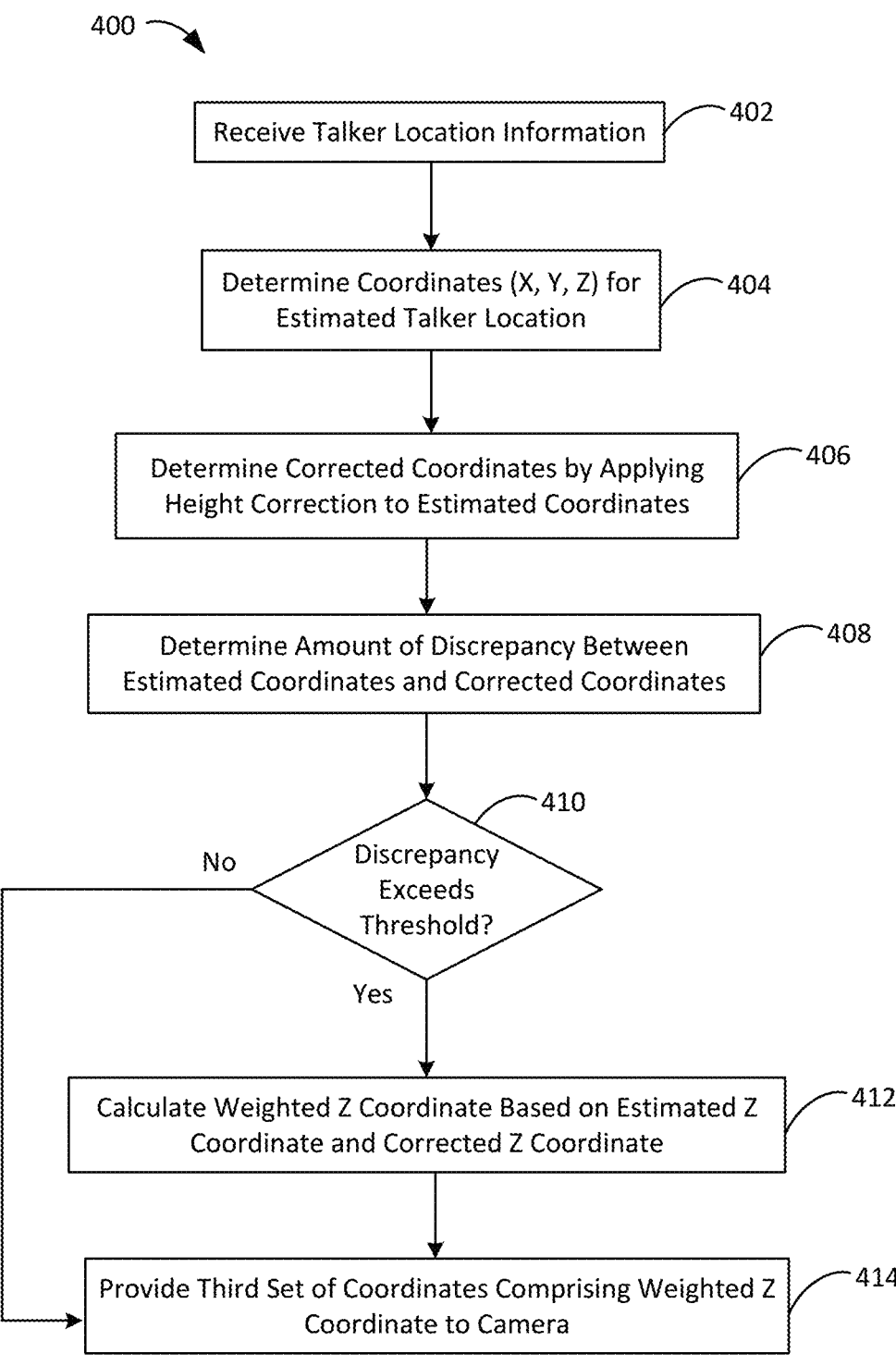
FIG. 4 is a flowchart illustrating exemplary operations for positioning a camera towards a talker location determined using talker coordinates obtained by at least one microphone in the presence of acoustic reflections, in accordance with one or more embodiments.

FIG. 4 illustrates an exemplary method or process 400 for positioning a camera towards a talker location determined using talker coordinates obtained by at least one microphone in the presence of acoustic reflections, in accordance with embodiments. The camera (e.g., camera 104 of FIG. 1 and/or camera 304 of FIG. 3) and the microphone (e.g., microphone 102 of FIG. 1 and/or microphone 302 of FIG. 3) may form part of an audio-visual system (e.g., system 300 of FIG. 3) located in an environment (e.g., environment 100 of FIG. 1). The environment may be a conferencing room, event space, or other area that includes one or more talkers (e.g., talker 102 of FIG. 1) or other audio sources. The camera may be configured to detect and capture image and/or video of the talker(s). The microphones may be configured to detect and capture sounds produced by the talker(s) and determine the locations of the detected sounds. The method 400 may be performed by one or more processors of the audio-visual system, such as a processor of a computing device included in the system and communicatively coupled to the camera and the microphones. In some cases, the method 400 may be performed by a control module (e.g., control module 116 of FIG. 1 or controller 306 of FIG. 3) included in the audio-visual system.

As shown in FIG. 4, the method 400 may include, at step 402, receiving, from the at least one microphone, sound location information for an audio source detected by the at least one microphone. For example, the sound location information may be audio localizations obtained by the microphone based on audio detected for an audio source. In some embodiments, the method 400 further comprises determining the sound location information using an audio localization algorithm executed by an audio activity localizer.

At step 404, the method 400 includes determining, based on the sound location information, a first set of coordinates representing an estimated talker location for the audio source. The first set of coordinates may be determined using, for example, a standard estimation technique that does not factor in any height information about the environment. At step 406, the method 400 includes determining, based on the sound location information and a height of the environment, a second set of coordinates representing a corrected talker location for the audio source. The second set of coordinates may be determined using, for example, a height-scaled estimation technique that factors in the ceiling height or microphone height.

At step 408, the method 400 includes determining an amount of discrepancy, or difference, between the first set of coordinates and the second set of coordinates. For example, a discrepancy between the z coordinate of the first set of coordinates and a z coordinate of the second set of coordinates may be determined by comparing the z coordinate values and calculating a difference between them, or otherwise determining whether they are close in value. At step 410, the method 400 includes determining whether the discrepancy calculated or determined at step 408 exceeds a threshold. The threshold can be configured to identify whether an acoustic reflection is present in the environment. For example, the threshold may be a value of about 50 centimeters in some embodiments. If the answer at step 410 is "no," it is assumed that an acoustic reflection is not present, and that the standard estimation technique is sufficient. In such cases, the first set of coordinates (or the estimated coordinates) may be used to represent the estimated talker location, in accordance with some embodiments. In other embodiments, the second set of coordinates (or the corrected coordinates) may be used to represent the estimated talker location. In either case, the method 400 may continue to step 414 from step 410 if a large discrepancy is not found.

If the answer at step 410 is "yes," the method 400 continues to step 412, where a third set of coordinates is generated by replacing the height coordinate of the first set of coordinates with the weighted height coordinate. More specifically, at step 412, the method 400 includes calculating a weighted height coordinate based on a first height coordinate of the first set of coordinates, a second height coordinate of the second set of coordinates, and stored height coordinates obtained for previously detected audio sources. The stored height coordinates may be used to generate a distribution curve (e.g., as shown by graph 200 in FIG. 2) and may be used with a likelihood weighting function to calculate the weighted height coordinate. For example, in embodiments, calculating a weighted height coordinate comprises determining a first weight value for the first height coordinate based on the stored height coordinates; determining a second weight value for the second height coordinate based on the stored height coordinates; and calculating, using the first weight value and the second weight value, a weighted average of the first height coordinate and the second height coordinate.

At step 414, the method 400 includes transmitting a final talker location to the camera in order to cause the camera to point an image capturing component of the camera towards the final talker location. According to embodiments, the camera can point the image capturing component towards the final talker location by adjusting one or more of an angle, a tilt, a zoom, and a framing of the camera.

In cases where the two estimations do not have a large discrepancy between them (i.e. the answer at step 410 is "no"), the final talker location may be indicated by either the first set of coordinates or the second set of coordinates. For example, in some embodiments, step 414 may include presenting the second set of coordinates as the final talker location, while in other embodiments, step 414 may include presenting the first set of coordinates as the final talker location.

In cases where there is a large difference between the coordinates produced by the two different estimation techniques (i.e. the answer at step 410 is "yes"), the final talker location may be indicated by a third set of coordinates comprising the weighted height coordinate. For example, in such cases, step 414 may include generating the third set of coordinates by replacing the first height coordinate of the first set of coordinates with the weighted height coordinate and keeping the x and y coordinates of the first set of coordinates as is.

In either case, the method 400 may end once step 414 is complete.

Thus, the techniques described herein can improve talker position estimation by running two different estimation techniques simultaneously, and upon identifying a large discrepancy between the two methods (which indicates a table reflection or the like), combining the measurements from each using a likelihood weighting function based on a height of the room. As a result, if a talker is looking down or across a table, the coordinates reported by the microphone will be more accurate than when using conventional estimation techniques.

The components of the audio-visual system 300 may be implemented in hardware (e.g., discrete logic circuits, application specific integrated circuits (ASIC), programmable gate arrays (PGA), field programmable gate arrays (FPGA), digital signal processors (DSP), microprocessor, etc.), using software executable by one or more computers, such as a computing device having a processor and memory (e.g., a personal computer (PC), a laptop, a tablet, a mobile device, a smart device, thin client, etc.), or through a combination of both hardware and software. For example, some or all components of the system 300 may be implemented using discrete circuitry devices and/or using one or more processors (e.g., audio processor and/or digital signal processor) executing program code stored in a memory (not shown), the program code being configured to carry out one or more processes or operations described herein, such as, for example, the method 400 shown in FIG. 4. Thus, in embodiments, the system 300 may include one or more processors, memory devices, computing devices, and/or other hardware components not shown in the figures.

All or portions of the processes described herein, including method 400 of FIG. 4, may be performed by one or more processing devices or processors (e.g., analog to digital converters, encryption chips, etc.) that are within or external to the corresponding conferencing system (e.g., system 300 of FIG. 3). In addition, one or more other types of components (e.g., memory, input and/or output devices, transmitters, receivers, buffers, drivers, discrete components, logic circuits, etc.) may also be used in conjunction with the processors and/or other processing components to perform any, some, or all of the steps of the method 400. As an example, in some embodiments, each of the methods described herein may be carried out by a processor executing software stored in a memory. The software may include, for example, program code or computer program modules comprising software instructions executable by the processor. In some embodiments, the program code may be a computer program stored on a non-transitory computer readable medium that is executable by a processor of the relevant device.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

Any of the processors described herein may include a general purpose processor (e.g., a microprocessor) and/or a special purpose processor (e.g., an audio processor, a digital signal processor, etc.). In some examples, the processor(s) described herein may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

Any of the memories or memory devices described herein may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory described herein includes multiple kinds of memory, particularly volatile memory and non-volatile memory.

Moreover, any of the memories described herein may be computer readable media on which one or more sets of instructions can be embedded. The instructions may reside completely, or at least partially, within any one or more of the memory, the computer readable medium, and/or within one or more processors during execution of the instructions. In some embodiments, the memory described herein may include one or more data storage devices configured for implementation of a persistent storage for data that needs to be stored and recalled by the end user. In such cases, the data storage device(s) may save data in flash memory or other memory devices. In some embodiments, the data storage device(s) can be implemented using, for example, SQLite data base, UnQLite, Berkeley DB, BangDB, or the like.

Any of the computing devices described herein can be any generic computing device comprising at least one processor and a memory device. In some embodiments, the computing device may be a standalone computing device included in the audio-visual system 300, or may reside in another component of the system 300, such as, e.g., any one of the microphone 302, the camera 304, and/or the controller 306. In such embodiments, the computing device may be physically located in and/or dedicated to the given environment or room, such as, e.g., the same environment in which the microphone 302 and camera 304 are located. In other embodiments, the computing device may not be physically located in proximity to the microphone 302 and camera 304 but may reside in an external network, such as a cloud computing network, or may be otherwise distributed in a cloud-based environment. Moreover, in some embodiments, the computing device may be implemented with firmware or completely software-based as part of a network, which may be accessed or otherwise communicated with via another device, including other computing devices, such as, e.g., desktops, laptops, mobile devices, tablets, smart devices, etc. Thus, the term "computing device" should be understood to include distributed systems and devices (such as those based on the cloud), as well as software, firmware, and other components configured to carry out one or more of the functions described herein. Further, one or more features of the computing device may be physically remote and may be communicatively coupled to the computing device.

In some embodiments, any of the computing devices described herein may include one or more components configured to facilitate a conference call, meeting, classroom, or other event and/or process audio signals associated therewith to improve an audio quality of the event. For example, in various embodiments, any computing device described herein may comprise a digital signal processor ("DSP") configured to process the audio signals received from the various microphones or other audio sources using, for example, automatic mixing, matrix mixing, delay, compressor, parametric equalizer ("PEQ") functionalities, acoustic echo cancellation, and more. In other embodiments, the DSP may be a standalone device operatively coupled or connected to the computing device using a wired or wireless connection. One exemplary embodiment of the DSP, when implemented in hardware, is the P300 IntelliMix Audio Conferencing Processor from SHURE, the user manual for which is incorporated by reference in its entirety herein. As further explained in the P300 manual, this audio conferencing processor includes algorithms optimized for audio/video conferencing applications and for providing a high quality audio experience, including eight channels of acoustic echo cancellation, noise reduction and automatic gain control. Another exemplary embodiment of the DSP, when implemented in software, is the IntelliMix Room from SHURE, the user guide for which is incorporated by reference in its entirety herein. As further explained in the IntelliMix Room user guide, this DSP software is configured to optimize the performance of networked microphones with audio and video conferencing software and is designed to run on the same computer as the conferencing software. In other embodiments, other types of audio processors, digital signal processors, and/or DSP software components may be used to carry out one or more of audio processing techniques described herein, as will be appreciated.

Moreover, any of the computing devices described herein may also comprise various other software modules or applications (not shown) configured to facilitate and/or control the conferencing event, such as, for example, internal or proprietary conferencing software and/or third-party conferencing software (e.g., Microsoft Skype, Microsoft Teams, Bluejeans, Cisco WebEx, GoToMeeting, Zoom, Join.me, etc.). Such software applications may be stored in the memory of the computing device and/or may be stored on a remote server (e.g., on premises or as part of a cloud computing network) and accessed by the computing device via a network connection. Some software applications may be configured as a distributed cloud-based software with one or more portions of the application residing in the computing device and one or more other portions residing in a cloud computing network. One or more of the software applications may reside in an external network, such as a cloud computing network. In some embodiments, access to one or more of the software applications may be via a web-portal architecture, or otherwise provided as Software as a Service (SaaS).

In general, a computer program product in accordance with embodiments described herein includes a computer usable storage medium (e.g., standard random access memory (RAM), an optical disc, a universal serial bus (USB) drive, or the like) having computer-readable program code embodied therein, wherein the computer-readable program code is adapted to be executed by a processor (e.g., working in connection with an operating system) to implement the methods described herein. In this regard, the program code may be implemented in any desired language, and may be implemented as machine code, assembly code, byte code, interpretable source code or the like (e.g., via C, C++, Java, ActionScript, Python, Objective-C, JavaScript, CSS, XML, and/or others). In some embodiments, the program code may be a computer program stored on a non-transitory computer readable medium that is executable by a processor of the relevant device.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

In this disclosure, the use of the disjunctive is intended to include the conjunctive. The use of definite or indefinite articles is not intended to indicate cardinality. In particular, a reference to "the" object or "a" and "an" object is intended to also denote one of a possible plurality of such objects.

This disclosure describes, illustrates and exemplifies one or more particular embodiments of the invention in accordance with its principles. The disclosure is intended to explain how to fashion and use various embodiments in accordance with the technology rather than to limit the true, intended, and fair scope and spirit thereof. That is, the foregoing description is not intended to be exhaustive or to be limited to the precise forms disclosed herein, but rather to explain and teach the principles of the invention in such a way as to enable one of ordinary skill in the art to understand these principles and, with that understanding, be able to apply them to practice not only the embodiments described herein, but also other embodiments that may come to mind in accordance with these principles. The embodiment(s) provided herein were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

What is claimed is:

1. A method performed by one or more processors in communication with each of a camera and at least one microphone disposed in an environment, the method comprising:

receiving, from the at least one microphone, sound location information for an audio source detected by the at least one microphone;

determining, based on the sound location information, a first set of coordinates representing an estimated talker location for the audio source;

determining, based on the sound location information and a height measurement of the environment, a second set of coordinates representing a corrected talker location for the audio source;

calculating a weighted height coordinate based on a first height coordinate of the first set of coordinates, a second height coordinate of the second set of coordinates, and stored height coordinates obtained for previously detected audio sources; and transmitting, to the camera, a third set of coordinates comprising the weighted height coordinate and representing a final talker location for the audio source, wherein receipt of the third set of coordinates causes the camera to point an image capturing component of the camera towards the final talker location.

2. The method of claim 1, further comprising:

determining an amount of discrepancy between the first set of coordinates and the second set of coordinates; and upon determining that the discrepancy exceeds a threshold, generating the third set of coordinates by replacing the height coordinate of the first set of coordinates with the weighted height coordinate.

3. The method of claim 2, wherein the threshold is configured to identify whether an acoustic reflection is present in the environment.

4. The method of claim 1, wherein calculating the weighted height coordinate comprises:

determining a first weight value for the first height coordinate based on the stored height coordinates;

determining a second weight value for the second height coordinate based on the stored height coordinates; and calculating, using the first weight value and the second weight value, a weighted average of the first height coordinate and the second height coordinate.

5. The method of claim 1, wherein the camera is configured to point the image capturing component towards the final talker location by adjusting one or more of an angle, a tilt, a zoom, and a framing of the camera.

6. The method of claim 1, further comprising: determining the sound location information using an audio localization algorithm executed by an audio activity localizer.

7. The method of claim 1, wherein the height measurement comprises a height of the at least one microphone relative to a floor of the environment.

8. A system comprising:

at least one microphone disposed in an environment and configured to determine sound location information for an audio source detected by the at least one microphone;

a camera disposed in the environment and comprising an image capturing component; and one or more processors communicatively coupled to each of the at least one microphone and the camera, the one or more processors configured to:

receive the sound location information from the at least one microphone;

determine, based on the sound location information, a first set of coordinates representing an estimated talker location for the audio source;

determine, based on the sound location information and a height measurement of the environment, a second set of coordinates representing a corrected talker location for the audio source;

calculate a weighted height coordinate based on a first height coordinate of the first set of coordinates, a second height coordinate of the second set of coordinates, and stored height coordinates obtained for previously detected audio sources; and transmit, to the camera, a third set of coordinates comprising the weighted height coordinate and representing a final talker location for the audio source, wherein responsive to receiving the third set of coordinates, the camera is configured to point the image capturing component towards the final talker location.

9. The system of claim 8, wherein the one or more processors are further configured to:

determine an amount of discrepancy between the first set of coordinates and the second set of coordinates; and upon determining that the discrepancy exceeds a threshold, generate the third set of coordinates by replacing the height coordinate of the first set of coordinates with the weighted height coordinate.

10. The system of claim 9, wherein the threshold is configured to identify whether an acoustic reflection is present in the environment.

11. The system of claim 8, wherein calculating the weighted height coordinate comprises:

determining a first weight value for the first height coordinate based on the stored height coordinates;

determining a second weight value for the second height coordinate based on the stored height coordinates; and calculating, using the first weight value and the second weight value, a weighted average of the first height coordinate and the second height coordinate.

12. The system of claim 8, wherein the camera is configured to point the image capturing component towards the final talker location by adjusting one or more of an angle, a tilt, a zoom, and a framing of the camera.

13. The system of claim 8, further comprising an audio activity localizer configured to determine the sound location information using an audio localization algorithm executed by the audio activity localizer.

14. The system of claim 8, wherein the height measurement comprises a height of the at least one microphone relative to a floor of the environment.

15. A non-transitory computer-readable storage medium comprising instructions that, when executed by one or more processors in communication with each of at least one microphone, and a camera, cause the one or more processors to perform the following:

receive sound location information for an audio source detected by the at least one microphone;

determine, based on the sound location information, a first set of coordinates representing an estimated talker location for the audio source;

determine, based on the sound location information and a height measurement of the environment, a second set of coordinates representing a corrected talker location for the audio source;

calculate a weighted height coordinate based on a first height coordinate of the first set of coordinates, a second height coordinate of the second set of coordinates, and stored height coordinates obtained for previously detected audio sources; and transmit, to the camera, a third set of coordinates comprising the weighted height coordinate and representing a final talker location for the audio source, wherein receipt of the third set of coordinates causes the camera to point an image capturing component of the camera towards the final talker location.

16. The non-transitory computer-readable storage medium of claim 15, wherein the instructions further cause the one or more processors to:

determine an amount of discrepancy between the first set of coordinates and the second set of coordinates; and upon determining that the discrepancy exceeds a threshold, generate the third set of coordinates by replacing the height coordinate of the first set of coordinates with the weighted height coordinate.

17. The non-transitory computer-readable storage medium of claim 16, wherein the threshold is configured to identify whether an acoustic reflection is present in the environment.

18. The non-transitory computer-readable storage medium of claim 15, wherein calculating the weighted height coordinate comprises:

determining a first weight value for the first height coordinate based on the stored height coordinates;

determining a second weight value for the second height coordinate based on the stored height coordinates; and calculating, using the first weight value and the second weight value, a weighted average of the first height coordinate and the second height coordinate.

19. The non-transitory computer-readable storage medium of claim 15, wherein the camera is configured to point the image capturing component towards the final talker location by adjusting one or more of an angle, a tilt, a zoom, and a framing of the camera.

20. The non-transitory computer-readable storage medium of claim 15, wherein the instructions further cause the one or more processors to determine the sound location information using an audio localization algorithm executed by an audio activity localizer.

* * * * *